(12) United States Patent
Hosoya et al.

(10) Patent No.: US 9,834,272 B2
(45) Date of Patent: Dec. 5, 2017

(54) SADDLE-RIDE TYPE VEHICLE

(71) Applicant: HONDA MOTOR CO., LTD., Tokyo (JP)

(72) Inventors: Kyohei Hosoya, Wako (JP); Tomoya Matsuo, Wako (JP); Munehiro Sugimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/048,124

(22) Filed: Feb. 19, 2016

(65) Prior Publication Data
US 2016/0272266 A1 Sep. 22, 2016

(30) Foreign Application Priority Data

Mar. 19, 2015 (JP) ................................. 2015-056237

(51) Int. Cl.
*B62K 11/04* (2006.01)
*B62J 23/00* (2006.01)

(52) U.S. Cl.
CPC ............... *B62K 11/04* (2013.01); *B62J 23/00* (2013.01)

(58) Field of Classification Search
CPC ......... B62K 11/00; B62K 11/02; B62K 11/04; B62K 17/00; B62K 19/00; B62K 19/30; B62J 23/00; B60Y 2200/12
USPC ............... 180/219, 69.1, 311, 312; 280/781; D12/107, 109, 110, 114, 117, 126
See application file for complete search history.

(56) References Cited

U.S. PATENT DOCUMENTS

| 2004/0206566 | A1* | 10/2004 | Katsura | ................. | B62K 19/12 180/219 |
| 2012/0139226 | A1* | 6/2012 | Yanagita | ................. | B62J 23/00 280/851 |
| 2014/0060952 | A1* | 3/2014 | Mizukura | ................ | B62M 7/00 180/231 |

FOREIGN PATENT DOCUMENTS

| CN | 201792939 U | 4/2011 |
| JP | 8-253185 A | 10/1996 |
| JP | 2006-176030 A | 7/2006 |
| JP | 2013193682 A * | 9/2013 |

* cited by examiner

*Primary Examiner* — Keith J Frisby
(74) *Attorney, Agent, or Firm* — Birch, Stewart, Kolasch & Birch, LLP

(57) ABSTRACT

A saddle-ride-type vehicle includes a vehicle body lower portion protective member for increasing the rigidity thereof and for protecting a vehicle body frame. A saddle-ride type vehicle includes a head pipe and a pair of left and right lower frames extending from the head pipe for supporting an engine. An engine guard extends from an area in front of the engine to an area below the engine. The engine guard includes an engine protective portion for covering the engine and a frame protective portion for protecting the lower frame. The engine protective portion and the frame protective portion are disposed with a step formed therebetween.

16 Claims, 12 Drawing Sheets

SADDLE-RIDE TYPE VEHICLE

CROSS-REFERENCE TO RELATED APPLICATIONS

The present application claims priority under 35 USC 119 to Japanese Patent Application No. 2015-056237 filed Mar. 19, 2015 the entire contents of which are hereby incorporated by reference.

BACKGROUND OF THE INVENTION

1. Field of the Invention

The present invention relates to a saddle-ride-type vehicle provided with a vehicle body lower portion protective member which protects a lower portion of a vehicle body.

2. Description of Background Art

A vehicle is known wherein an engine guard is formed with a lower covering portion for covering a lower portion of an engine from below and a front covering portion extending upwardly from a front portion of the lower covering portion for covering a front portion of the lower portion of the engine and being arranged between left and right lower frames. See, for example, JP-A-2006-176030.

In JP-A-2006-176030, the engine guard is formed in a flat plate shape. Thus, no improvement is made with respect to a shape of the engine guard for enhancing the rigidity of the engine guard. Although increasing the plate thickness of the engine guard may be considered to enhance the rigidity of the engine guard, for example, an increase in the weight of the engine guard or the increase in the cost of the engine guard are brought about. Further, the vehicle adopts the structure where the engine guard is disposed between left and right lower frames and the lower frames are exposed. Thus, the lower frames are likely to interfere with stones or projections on a ground or the like.

SUMMARY AND OBJECTS OF THE INVENTION

Accordingly, it is an object of an embodiment of the present invention to provide a saddle-ride-type vehicle provided with a vehicle body lower portion protective member for increasing the rigidity thereof and also for protecting the vehicle body frame.

To overcome the above-mentioned drawbacks, according to an embodiment of the present invention, a saddle-ride-type vehicle which includes a head pipe (21); a frame member (27) which extends from the head pipe (21) and supports an engine (35); and a vehicle body lower portion protective member (61) which extends from an area in front of the engine (35) to an area below the engine (35). The vehicle body lower portion protective member (61) includes an engine protective portion (61b) which covers the engine (35); and a frame protective portion (61a) which protects the frame member (27), and the engine protective portion (61b) and the frame protective portion (61a) are disposed with a step formed therebetween.

According to an embodiment of the present invention, the frame protective portion (61a) may be formed of a pair of frame protective portions (61a) disposed in a spaced-apart manner from each other in a vehicle width direction, and the engine protective portion (61b) may be disposed integrally with the pair of frame protective portions (61a) with the step formed therebetween.

According to an embodiment of the present invention, the engine protective portion (61b) may be disposed in an indented manner toward the inside of a vehicle body compared to the frame protective portion (61a).

According to an embodiment of the present invention, a weld bead (103) for welding with another member may be formed on the frame member (27), and an opening portion (61h) may be formed in a portion of the frame protective portion (61a) which corresponds to the weld bead (103).

According to an embodiment of the present invention, the saddle-ride-type vehicle may include a cross frame (91) which is joined between the pair of frame members (27), and the vehicle body lower portion protective member (61) may be fixed to the cross frame (91) in a longitudinal direction of the vehicle.

According to an embodiment of the present invention, a fixing portion (61g) may be provided to a rear end portion (61j) of the vehicle body lower portion protective member (61) at the center in a vehicle width direction for fixing the vehicle body lower protective member (61) to the cross frame (91), and the rear end portion (61j) of the vehicle body lower portion protective member (61) may be formed in a tapered shape as the rear end portion (61j) extends rearwardly in the longitudinal direction of the vehicle.

According to an embodiment of the present invention, the fixing portion (61g) is a recessed portion indented toward the inside of the vehicle, and a bolt through hole (61v) which allows a fixing bolt (98) for fixing the engine body lower portion protective member (61) to the cross frame (91) to pass therethrough may be formed in a rear end portion of the recessed portion.

According to an embodiment of the present invention, the frame protective portion (61a) may be configured such that a rib (61q) is formed along a side surface of the frame member (27), and the fixing portion (61g) may be disposed at a position where the fixing portion (61g) overlaps with the rib (61q) as viewed in a side view.

According to an embodiment of the present invention, the vehicle body lower portion protective member (61) may include an engine side surface protective portion (61k) which covers a side surface of the engine (35) from the outside in a vehicle width direction, and the engine side surface protective portion (61k) may be disposed at a position where the engine side surface protective portion (61k) overlaps with a gear changing pedal (51) provided to a transmission (44) attached to the engine (35) in a height direction as viewed from a front side of the vehicle.

According to an embodiment of the present invention, the vehicle body lower portion protective member includes the engine protective portion for covering the engine; and the frame protective portion for protecting the frame member. The engine protective portion and the frame protective portion are disposed with a step formed therebetween. With such a configuration, the frame member is protected by the frame protective portion. Further, by providing the engine protective member and the frame protective portion with the step formed therebetween, a modulus of section of the vehicle body lower portion protective member can be increased. Thus, rigidity of the vehicle body lower portion protective member can be increased.

The frame protective portion is formed of a pair of frame protective portions disposed in a spaced-apart manner from each other in a vehicle width direction. The engine protective portion is disposed integrally with the pair of frame protective portions with the step formed therebetween. With such a configuration, the engine protective portion is supported on the frame protective portions. Thus, the rigidity of the vehicle body lower portion protective member can be further increased. Further, the frame protective portions are integrally formed with the engine protective portion. Thus, a bracket for fixing the frame protective portion or the engine protective portion to a vehicle body side becomes unnecessary whereby the configuration can be simplified.

The engine protective portion is disposed in an indented manner toward the inside of a vehicle body compared to the frame protective portion. With such a configuration, the engine protective portion does not project from the frame protective portion. Thus, a minimum ground clearance of the vehicle is not lowered whereby the interference of the engine protective portion with an obstacle can be suppressed.

The weld bead for welding with another member is formed on the frame member, and the opening portion is formed in a portion of the frame protective portion corresponding to the weld bead. With such a configuration, it is unnecessary to form a projecting portion on the frame protective portion corresponding to the weld bead of the frame member. Thus, a minimum ground clearance of the vehicle is not lowered whereby an interference of the frame member with an obstacle can be suppressed.

The saddle-ride-type vehicle includes the cross frame which connects the pair of frame members to each other. The vehicle body lower portion protective member is fixed to the cross frame in a longitudinal direction of the vehicle. With such a configuration, there is no possibility that a fixing member such as a bolt for fixing the vehicle body lower portion protective member to the vehicle body projects to an area below the vehicle. Thus, a minimum ground clearance of the vehicle is not lowered whereby the interference of the fixing member with an obstacle can be suppressed.

The fixing portion is provided to the rear end portion of the vehicle body lower portion protective member at the center in a vehicle width direction for fixing the vehicle body lower protective member to the cross frame. The rear end portion of the vehicle body lower portion protective member is formed in a tapered shape as the rear end portion extends rearwardly in the longitudinal direction of the vehicle. With such a configuration, rattling of the rear end portion fixed by the fixing portion can be suppressed, and the rear end portion can be fixed at the small number of fixing positions.

The fixing portion is a recessed portion indented toward the inside of the vehicle. A bolt through hole, for allowing a fixing bolt for fixing the vehicle body lower portion protective member to the cross frame to pass therethrough, is formed in the rear end portion of the recessed portion. With such a configuration, it is possible to make the fixing bolt minimally interfere with an obstacle.

The frame protective portion is configured such that the rib is formed along the side surface of the frame member, and the fixing portion is disposed at a position where the fixing portion overlaps with the rib as viewed in a side view. With such a configuration, a modulus of the section of the vehicle body lower portion protective member can be increased. Thus, the rigidity of the vehicle body lower portion protective member can be increased.

The vehicle body lower portion protective member includes the engine side surface protective portion for covering the side surface of the engine from the outside in a vehicle width direction. The engine side surface protective portion is disposed at the position where the engine side surface protective portion overlaps with the gear changing pedal provided to the transmission attached to the engine in a height direction as viewed from a front side of the vehicle. With such a configuration, a portion positioned on a side surface of the engine can be protected by the engine side surface protective portion, and the gear changing pedal can be protected from an object scattered from a front side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10(A) and FIG. 10(B) are first explanatory views for explaining the engine guard, wherein FIG. 10(A) is a perspective view of the engine guard as viewed from an oblique lower side, and FIG. 10(B) is a left side view of the engine guard;

FIG. 11(A) and FIG. 11(B) are second explanatory views for explaining the engine guard, wherein FIG. 11(A) is a front view of the engine guard, and FIG. 11(B) is a bottom view of the engine guard; and FIG. 12(A) and FIG. 12(B) are third explanatory views for explaining the engine guard, wherein FIG. 12(A) is a perspective view of the engine guard as viewed from an oblique upper side, and FIG. 12(B) is a plan view of the engine guard.

DETAILED DESCRIPTION OF THE PREFERRED EMBODIMENTS

Hereinafter, one embodiment of the invention is explained with reference to drawings. In the explanation, the descriptions of directions such as "front," "rear," "left," "right," "up" and "down" are equal to the directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
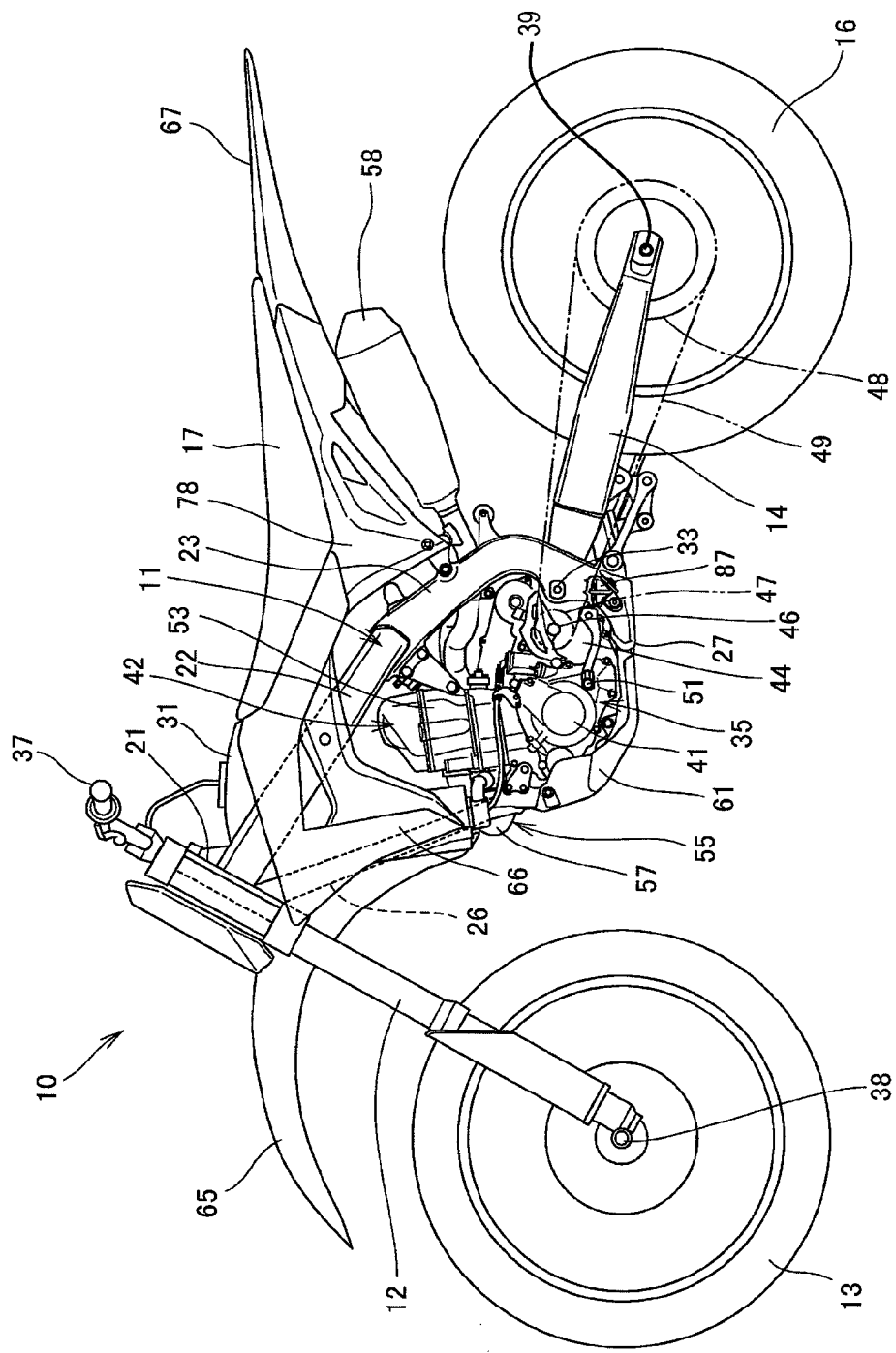
FIG. 1 is a left side view showing a motorcycle according to the invention.

FIG. 1 is a left side view showing a motorcycle 10 according to the invention.

The motorcycle 10 includes a front wheel 13 which is supported on a front end portion of a vehicle body frame 11 by way of a front fork 12 with a rear wheel 16 which is supported on a lower portion of a rear portion of the vehicle body frame 11 by way of a swing arm 14. A seat 17 is supported on an upper portion of the vehicle body frame 11. As described above, the motorcycle 10 is a saddle-ride-type vehicle where a rider rides on the vehicle in a state where the rider straddles the seat 17.

The vehicle body frame 11 includes a head pipe 21; a pair of left and right main frames 22; a pair of left and right center frames 23; a seat frame (not shown in the drawing); a down frame 26; and a pair of left and right lower frames 27.

The head pipe 21 forms a front end portion of the vehicle body frame 11, and supports the front fork 12 in a steerable manner. The main frames 22 extend obliquely rearwardly and downwardly from an upper portion of the head pipe 21, and support the seat 17 and a fuel tank 31 which is arranged in front of the seat 17. The center frames 23 extend obliquely rearwardly and downwardly from rear end portions of the main frames 22 and also extend substantially downwardly, respectively. A pivot shaft 33 for supporting a front end portion of the swing arm 14 in a swingable manner extends between the left and right center frames 23.

The seat frame is supported on the left and right center frames 23 and supports the seat 17 on an upper portion thereof. The down frame 26 extends substantially downwardly from a lower portion of the head pipe 21. The left and right lower frames 27 extend in the left and right directions as well as in the downward direction from a lower end portion of the down frame 26, respectively, further extend rearwardly, respectively, and are connected to lower end portions of the left and right center frames 23 respectively.

An engine 35 is supported on the above-mentioned left and right center frames 23, the down frame 26, and the left and right lower frames 27.

The front fork 12 supports a bar handle 37 on an upper end portion thereof, and supports the front wheel 13 on a lower end portion thereof by way of a front axle 38. The swing arm 14 supports the rear wheel 16 on a rear end portion thereof by way of a rear axle 39.

The engine 35 includes a crankcase 41, and a cylinder portion 42 which extends upwardly from an upper portion of a front portion of the crankcase 41.

A transmission 44 is integrally mounted on a rear portion of the crankcase 41. The transmission 44 is configured such that a drive sprocket 47 is mounted on an output shaft 46 of the transmission 44, and a chain 49 extends between and around the drive sprocket 47 and a driven sprocket 48 which is integrally mounted on the rear wheel 16. The transmission 44 also includes a gear changing pedal 51 which is arranged on a left side of a lower portion of the crankcase 41 to allow a driver to perform a gear shift operation.

The cylinder portion 42 includes a cylinder head 53, an intake device 54 (see FIG. 2) connected to a rear portion of the cylinder head 53, and an exhaust device 55 connected to a front portion of the cylinder head 53. The exhaust device 55 includes an exhaust pipe 57 connected to the cylinder head 53; and a muffler 58 connected to a rear end portion of the exhaust pipe 57.

An engine guard 61 which covers the engine 35, the left and right lower frames 27 and the like from a front side and below is arranged on a lower portion of a front portion of the vehicle body.

In the drawings, a front fender 65 covers the front wheel 13 from above, a pair of left and right shrouds 66 cover the main frames 22 and the down frame 26 on an upper portion of the front portion of the vehicle body from the sides, respectively. A rear fender 67 covers the rear wheel 16 from above with side covers 78 for covering a lower side of side edge portions of the seat 17 and the seat frame from sides, respectively.

Figure 2:
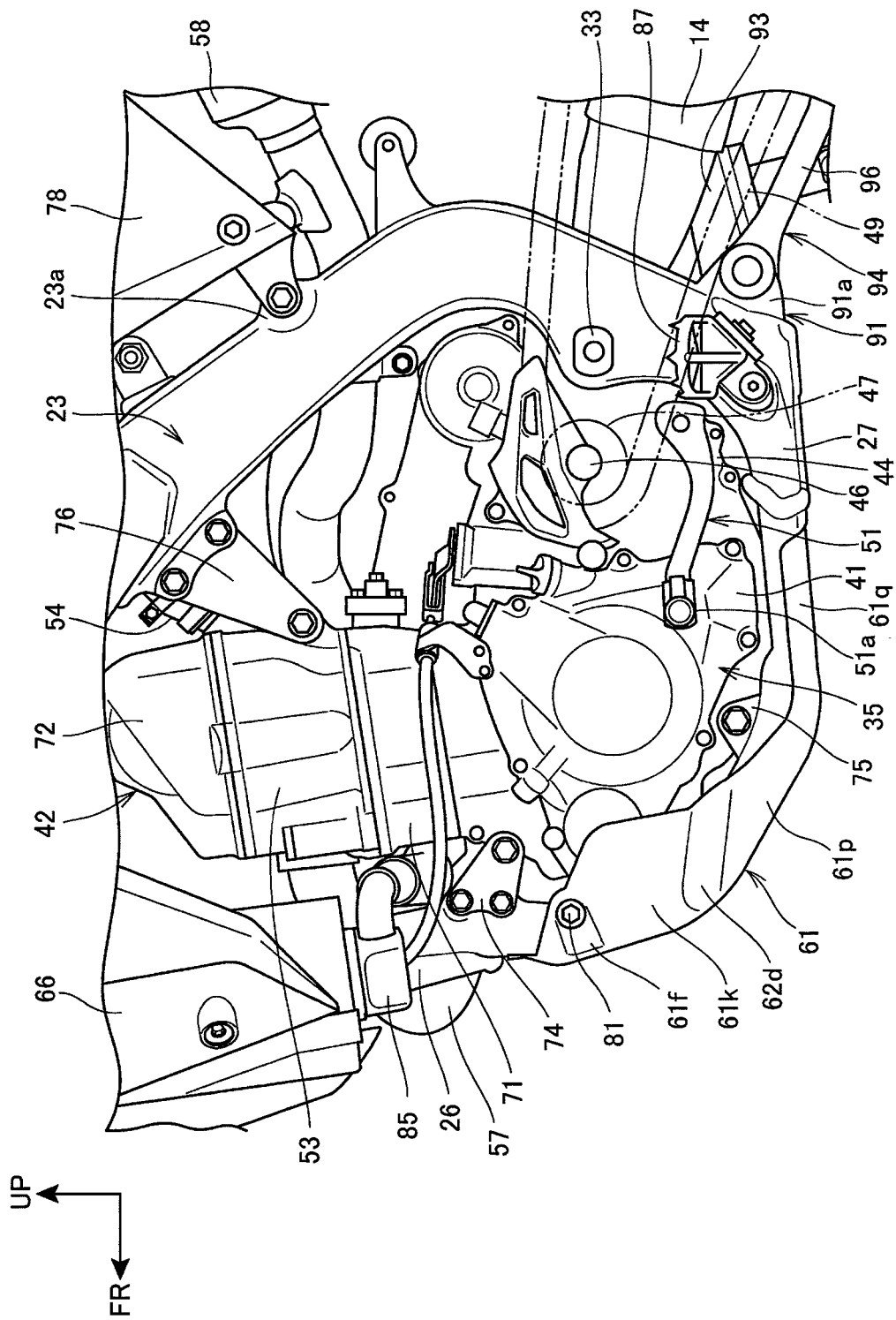
FIG. 2 is a left side view showing a lower portion of a front portion of a vehicle body.

FIG. 2 is a left side view showing the lower portion of the front portion of the vehicle body.

The cylinder portion 42 of the engine 35 includes a cylinder block 71 mounted on an upper portion of the front portion of the crankcase 41; a cylinder head 53 mounted on an upper portion of the cylinder block 71; and a head cover 72 for covering an opening formed in an upper portion of the cylinder head 53.

In the engine 35, an upper portion of a front portion of the crankcase 41 and a lower portion of the front portion of the crankcase 41 are supported on engine hangers 74, 75 which are mounted on the down frame 26 and the lower frames 27, respectively. A rear portion of the cylinder head 53 is supported on engine hangers 76 which are mounted on the center frames 23, respectively.

On the lower frames 27, the engine guard 61 which covers the engine 35, to be more specific, the crankcase 41 including the transmission 44 and the lower frames 27 per se from a front side, from lateral sides and from below is mounted. An upper end portion of the engine guard 61 is fastened to upper portions of the left and right lower frames 27 by using bolts 81.

The engine guard 61 covers the crankcase 41 of the engine 35 and a portion of the lower frames 27 from lateral sides. To be more specific, the engine guard 61 includes side wall portions 61d on left and right side portions thereof, respectively. The side wall portion 61d is formed of a sidewardly bulging portion 61k which constitutes an upper portion of the side wall portion 61d, and a front raised wall portion 61p and a rear raised wall portion 61q which constitute a lower portion of the side wall portion 61d. The sidewardly bulging portion 61k covers a front end portion of the crankcase 41 from the side, and the side wall portion 61d covers a portion of the lower frame 27 from the side as a whole.

A pair of radiators 85 is arranged on left and right sides of the down frame 26 is supported on the down frame 26. The left and right radiators 85 are covered by the shrouds 66 from the lateral sides, respectively.

The center frame 23 is bent in an approximately V shape, includes a frame support portion 23a which supports a portion of the vehicle body frame 11 on an upper portion thereof. A step 87 for a rider is mounted on a side portion of a lower end portion of the center frame 23.

Figure 3:
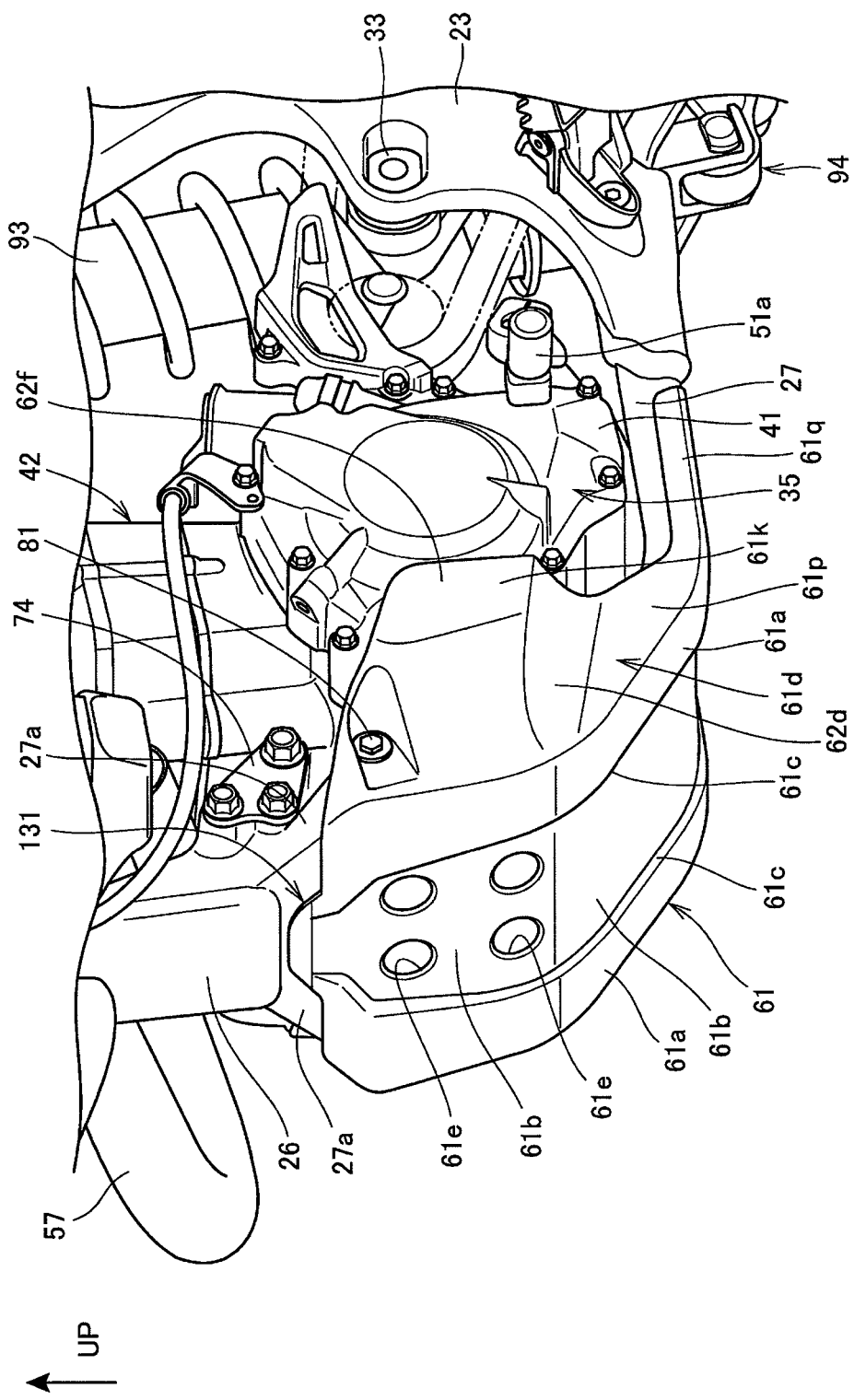
FIG. 3 is a perspective view of the lower portion of the front portion of the vehicle body as viewed from an oblique front side.

FIG. 3 is a perspective view of the lower portion of the front portion of the vehicle body as viewed from an oblique front side.

The engine guard 61 is formed into a shape where a front portion of the engine guard 61 is bent in a projecting manner in an obliquely frontward and downward direction, and includes a pair of left and right frame protective portions 61a, 61a; an engine protective portion 61b; a pair of left and right vertical wall portions 61c; and a pair of left and right side wall portions 61d.

The frame protective portions 61a cover the left and right lower frames 27, 27 from a front side and from below respectively. The engine protective portion 61b is provided between the left and right frame protective portions 61a, 61a and covers the crankcase 41 from a front side and below. The vertical wall portion 61c is a portion raised toward the inside of the vehicle body from an inner edge of the frame protective portion 61a, and integrally connects the frame protective portion 61a and the engine protective portion 61b to each other. Steps are formed between the frame protective portions 61a and the engine protective portion 61b due to the provision of the vertical wall portions 61c. The engine protective portion 61b is formed in an indented manner toward the inside of the vehicle body with respect to the frame protective portion 61a.

The side wall portion 61d covers a portion of the crankcase 41 and a portion of the lower frame 27 from the side. More specifically, a portion of the side wall portion 61d which is positioned on the side of the lower frame 27 protects the lower frame 27 by covering the lower frame 27 from the side. Thus, the side wall portion 61d is included in the frame protective portion 61a.

The sidewardly bulging portion 61k has a bulging portion lower wall 62d formed such that the bulging portion lower wall 62d is gradually lowered toward the inside in the vehicle width direction on a lower portion thereof. The bulging portion lower wall 62d is a portion which is sharply bent inwardly in the vehicle width direction with respect to a side surface 62f of the sidewardly bulging portion 61k.

As described above, by forming the bulging portion lower wall 62d on the lower portion of the sidewardly bulging portion 61k, the lower portion of the sidewardly bulging portion 61k can be formed in such a manner that the lower portion of the sidewardly bulging portion 61k is cut horizontally. Thus, a projection area of the sidewardly bulging portion 61k from a front side can be decreased. As a result, it is possible to suppress air resistance during the operation of the vehicle.

A plurality of holes 61e is formed in the engine protective portion 61b of the engine guard 61. The holes 61e play a role of reducing the weight of the engine guard 61, and also play a role of supplying air to the engine 35.

Figure 4:
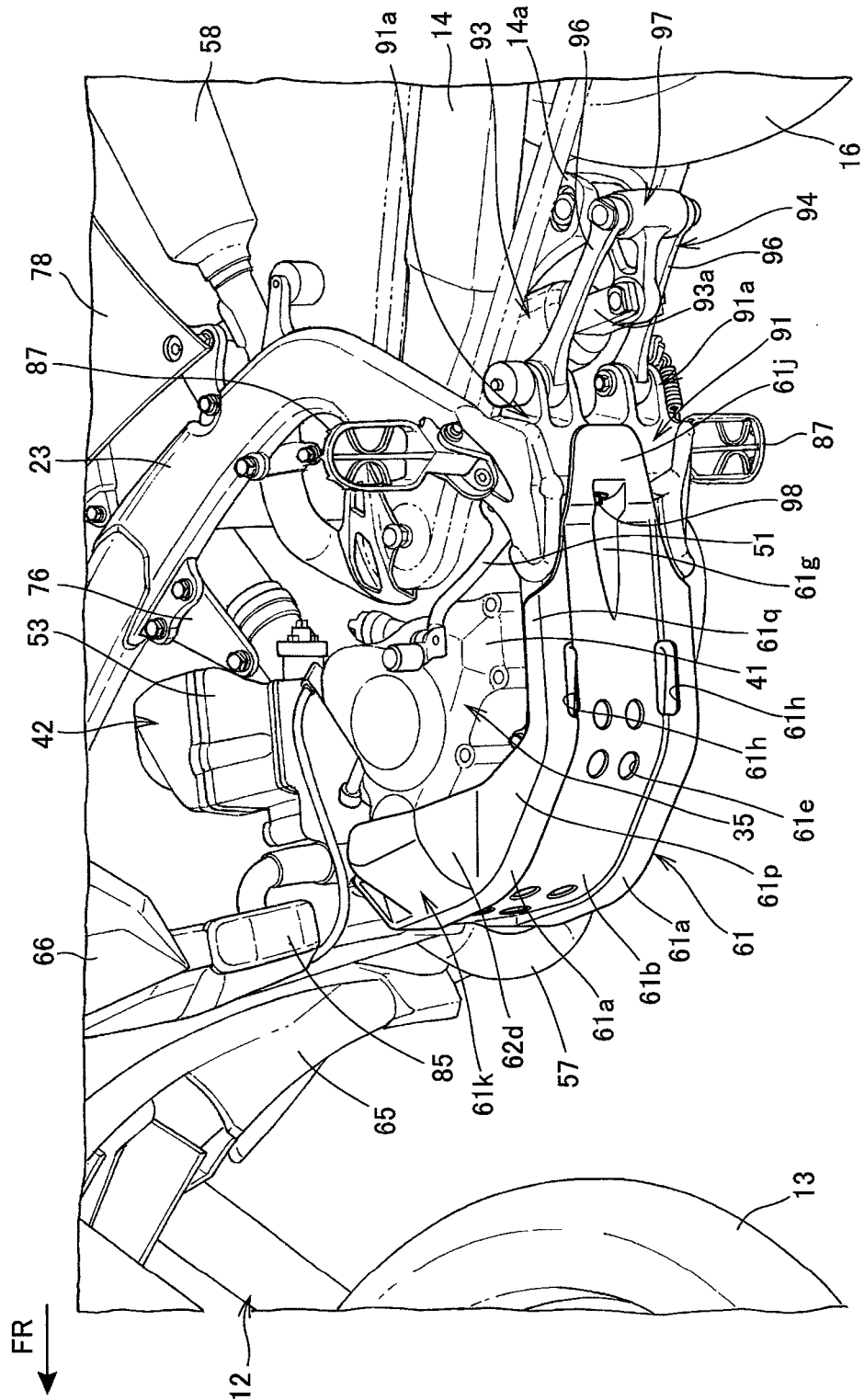
FIG. 4 is a perspective view showing a lower portion of the vehicle body as viewed from an oblique lower side.

FIG. 4 is a perspective view of the lower portion of the vehicle body as viewed from an oblique lower side.

The left and right center frames 23, 23 have lower end portions thereof connected to each other by a cross frame 91 which extends in the vehicle width direction. A pair of left and right link support portions 91a, 91a is formed on a rear portion of the cross frame 91.

A link mechanism 94 is connected to the link support portions 91a, 91a, the swing arm 14 with a rear shock absorber unit 93 which being provided as a buffer for the rear wheel 16.

The link mechanism 94 is formed of a pair of left and right first links 96 connected to the link support portions 91a, 91a in a swingable manner; and a second link 97 which is swingably connected to rear end portions of the first links 96. The first link 96 is formed of a straight rod. The second link 97 is formed into a triangular shape, and a rear end portion of the first link 96, a lower support portion 14a formed on a lower portion of the swing arm 14, and a lower end portion 93a of the rear shock absorber unit 93 are swingably connected to respective vertexes of the triangular shape.

An upper end portion of the rear shock absorber unit 93 is swingably connected to a cross frame (not shown in the drawing) which extends between the left and right main frames 22 (see FIG. 1) so as to extend in the vehicle width direction.

The engine guard 61 has a rear fixing portion 61g formed into a recessed shape for fixing the engine guard 61 to the cross frame 91 on a rear portion thereof. The rear fixing portion 61g is fixed to a front portion of the cross frame 91 using a single bolt 98.

Figure 5:
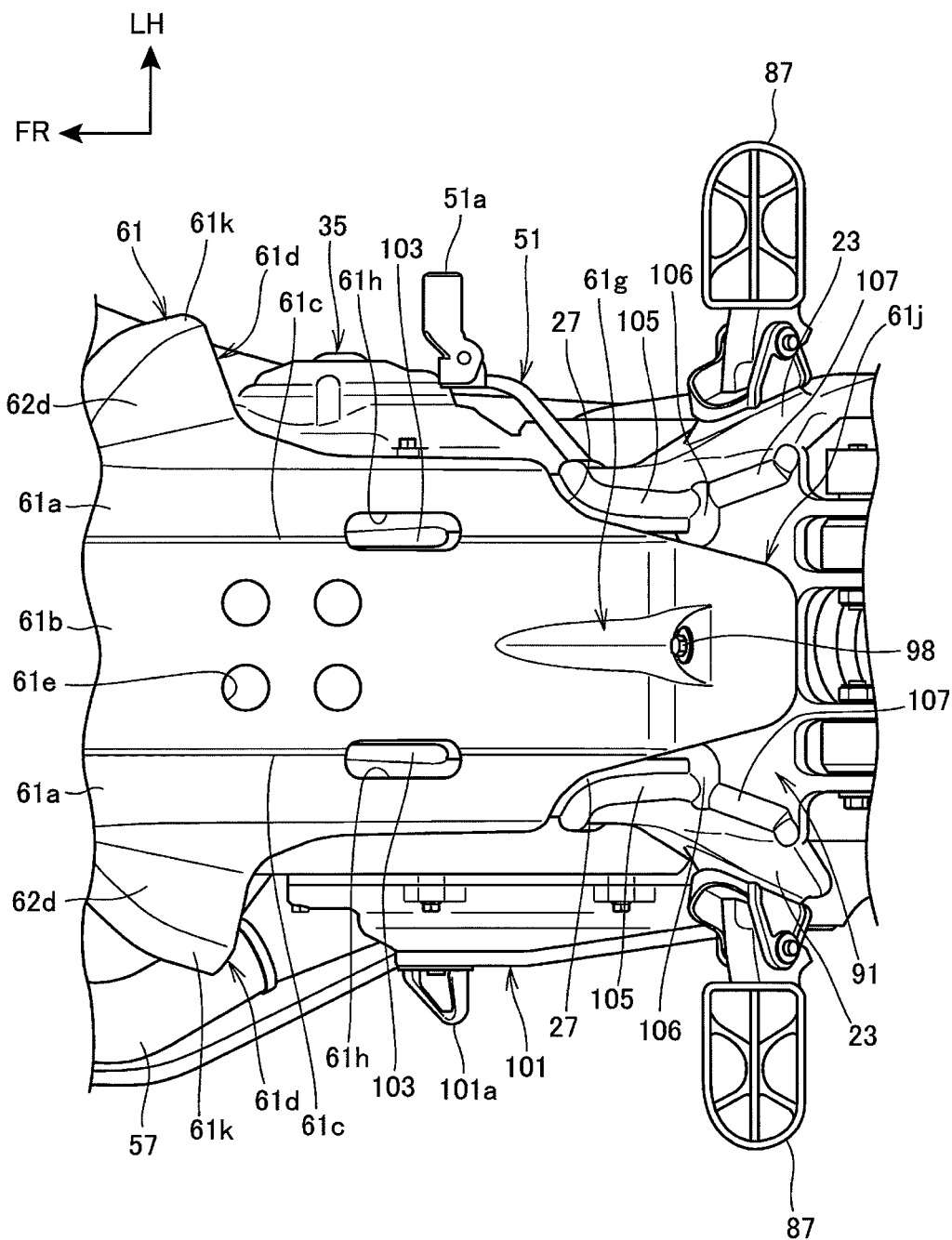
FIG. 5 is a bottom view showing an engine guard and the surrounding of the engine guard.

FIG. 5 is a bottom view showing the engine guard 61 and the surrounding of the engine guard 61.

The rear fixing portion 61g of the engine guard 61 is arranged in a longitudinally extending manner at the center in the vehicle width direction.

The engine guard 61 includes a pair of left and right opening portions 61h, 61h formed at positions in front of the rear fixing portion 61g and inside a stepping portion 51a of the gear changing pedal 51 and a stepping portion 101a of a brake pedal 101 disposed on a right side portion of the vehicle body respectively in the vehicle width direction.

The opening portions 61h are elongated holes formed in an extending manner in the longitudinal direction from the frame protective portion 61a to the engine protective portion 61b. The opening portions 61h are formed so as to prevent the interference between weld beads 103 which are formed on the left and right lower frames 27, respectively, and the engine guard 61. Further, due to the provision of the opening portions 61h, it is possible to realize a reduction in the weight of the engine guard 61, and it is also possible to discharge rain water and muddy water accumulated in the frame protective portion 61a.

A rear end portion 61j of the engine guard 61 is formed such that a width of the rear end portion 61j in the vehicle width direction is gradually narrowed toward a rear side from a position just in front of rear end portions of the lower frames 27. The rear end portion 61j extends to a rear edge of the cross frame 91.

The reason that the width of the rear end portion 61j is set gradually narrowed toward the rear side is to prevent the rear end portion 61j from interfering with connecting portions between the center frames 23 and the lower frames 27 (that is, weld beads 105) and welded portions between the lower frames 27 and the cross frame 91 (that is, weld beads 106). Connecting portions 107 are formed between the center frames 23 and the cross frame 91 (more specifically, weld beads)

By arranging the engine guard 61 so as to avoid the weld beads 105 to 107 as described above, it is unnecessary to form projecting portions on the engine guard 61 along the weld beads 105 to 107 which project downwardly. Thus, a minimum ground clearance of the vehicle is not lowered thus suppressing the interference of the engine guard 61 with stones and obstacles such as projections from the ground surface.

Figure 6:
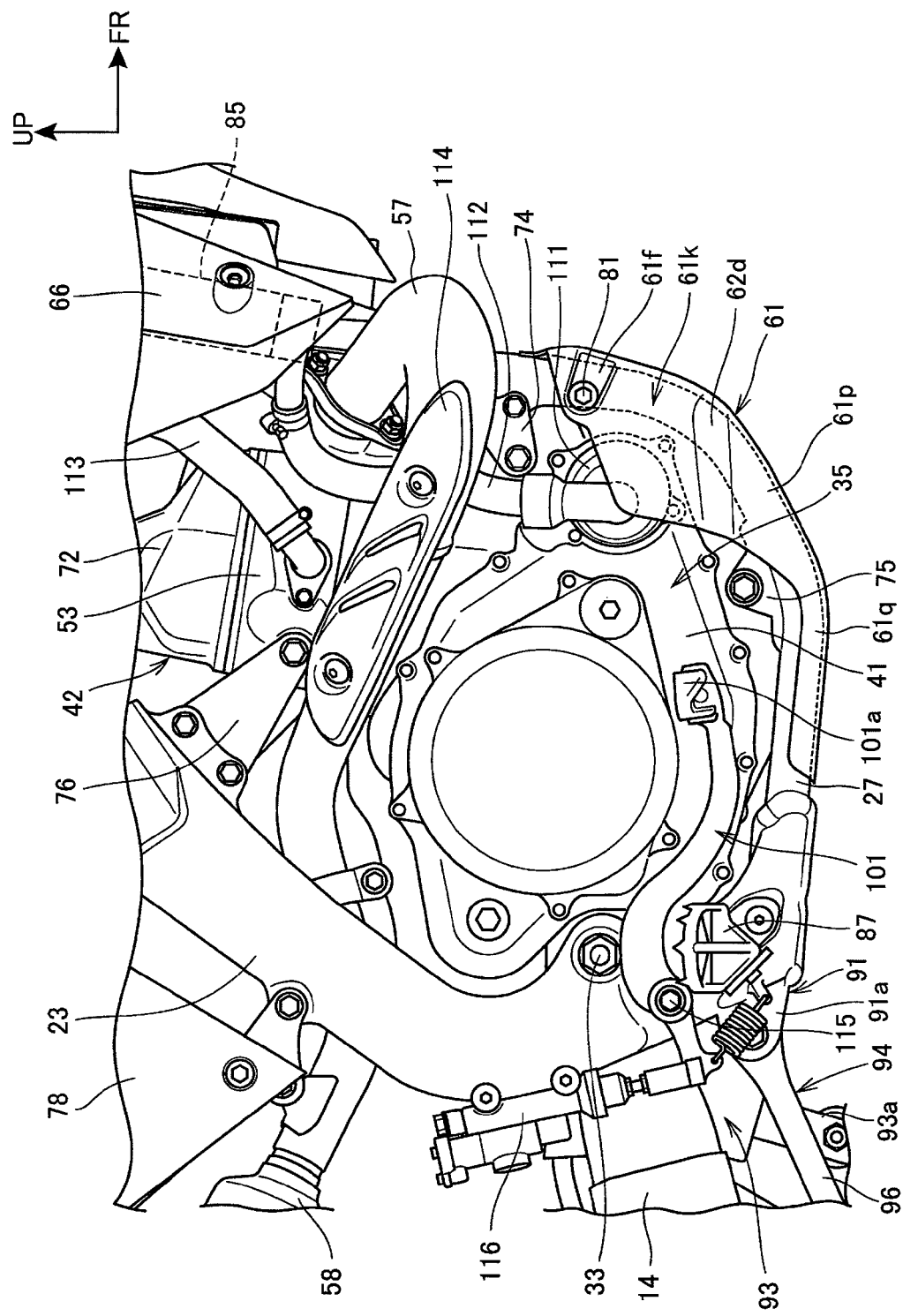
FIG. 6 is a right side view showing the lower portion of the front portion of the vehicle body.

FIG. 6 is a right side view showing the lower portion of the front portion of the vehicle body.

A water pump 111 is mounted on a right side surface of a front end portion of the crankcase 41, and a radiator hose 112 extends from the water pump 111 to a lower portion of the radiator 85. A radiator hose 113 is connected to an upper portion of the radiator 85 and a right side surface of the cylinder head 53.

The water pump 111 is covered and protected by the engine guard 61 from a front side, from the side and from below. To be more specific, the water pump 111 is covered by the sidewardly bulging portion 61k which forms an upper portion of the side wall portion 61d of the engine guard 61 from the side.

The exhaust pipe 57 extends to the side from the front portion of the cylinder head 53, is further bent and extends obliquely rearwardly and upwardly, passes through an area above the crankcase 41 and inside the center frame 23 in the vehicle width direction, and is connected to the muffler 58 arranged behind the center frame 23. A heat shielding cover 114 is mounted on the exhaust pipe 57.

On a lower end portion of the center frame 23, a pedal support shaft 115 is arranged in the vicinity of the step 87 for a rider and swingably supports the brake pedal 101 with a master cylinder 116 being arranged above the pedal support shaft 115 for generating a brake liquid pressure by an operation of the brake pedal 101.

Figure 7:
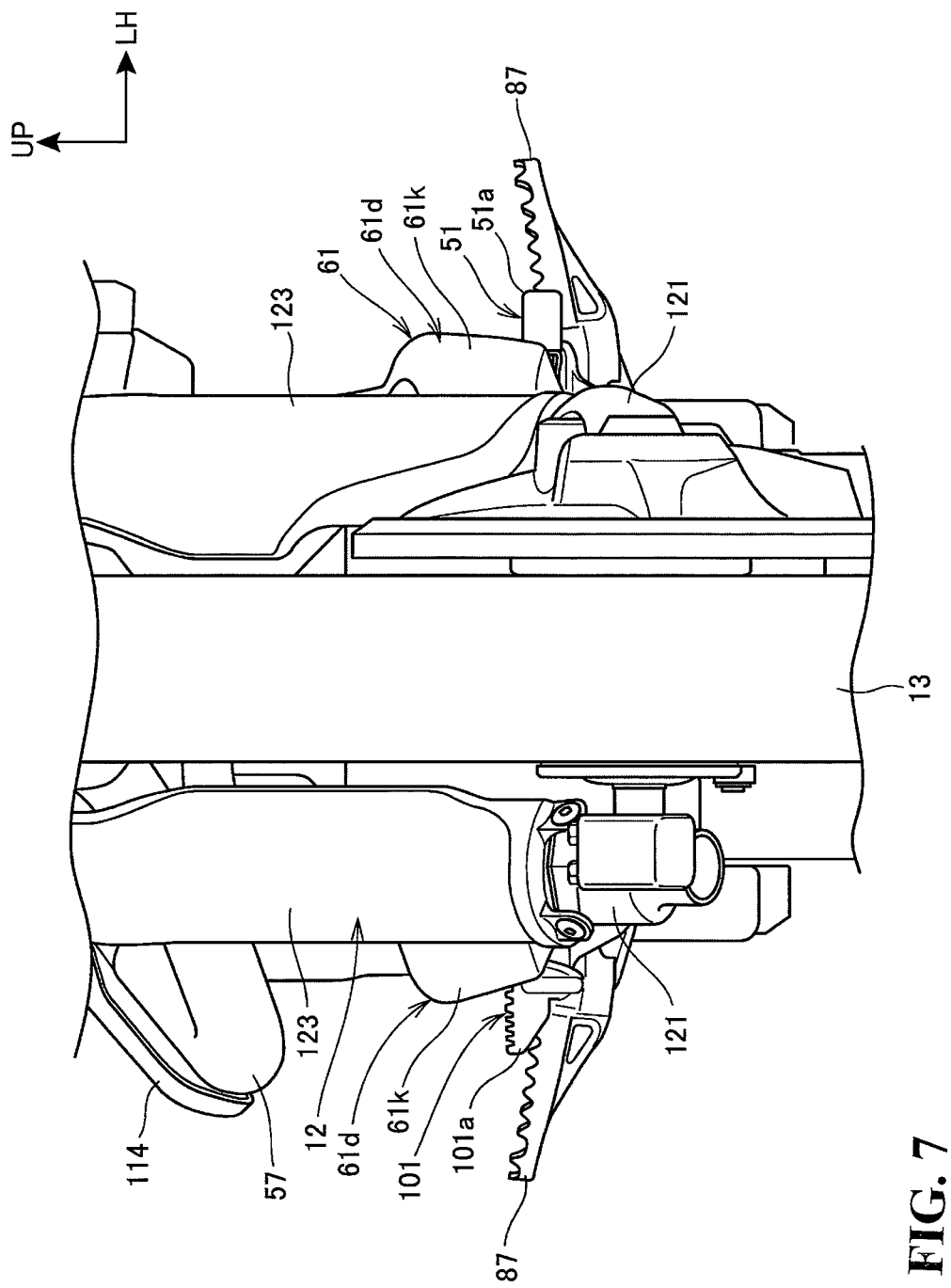
FIG. 7 is a front view showing the lower portion of the front portion of the vehicle body.

FIG. 7 is a front view showing the lower portion of the front portion of the vehicle body.

The side wall portions 61d, 61d of the engine guard 61, to be more specific, the sidewardly bulging portions 61k, 61k project more outwardly than left and right fork tubes 121, 121 which form the front fork 12 in the vehicle width direction.

Further, the sidewardly bulging portions 61k, 61k are arranged such that the height position of the sidewardly bulging portions 61k, 61k overlaps with the height position of the gear changing pedal 51, the brake pedal 101, and the steps 87, 87 for a rider which are arranged on left and right sides of the vehicle body, respectively, so as to project more outwardly than the sidewardly bulging portions 61k, 61k in the vehicle width direction.

The left side wall portion 61d covers the stepping portion 51a of the gear changing pedal 51 from a front side except for a side end portion of the stepping portion 51a. With such a configuration, it is possible to protect the gear changing pedal 51 and a rider's leg which operates the gear changing pedal 51 by covering the gear changing pedal 51 and a rider's leg by the sidewardly bulging portion 61k from a front side.

Fork guard members 123 are mounted on lower end portions of the left and right fork tubes 121, 121, respectively, with the fork guard members 123 covering the fork tubes 121 from a front side.

Figure 8:
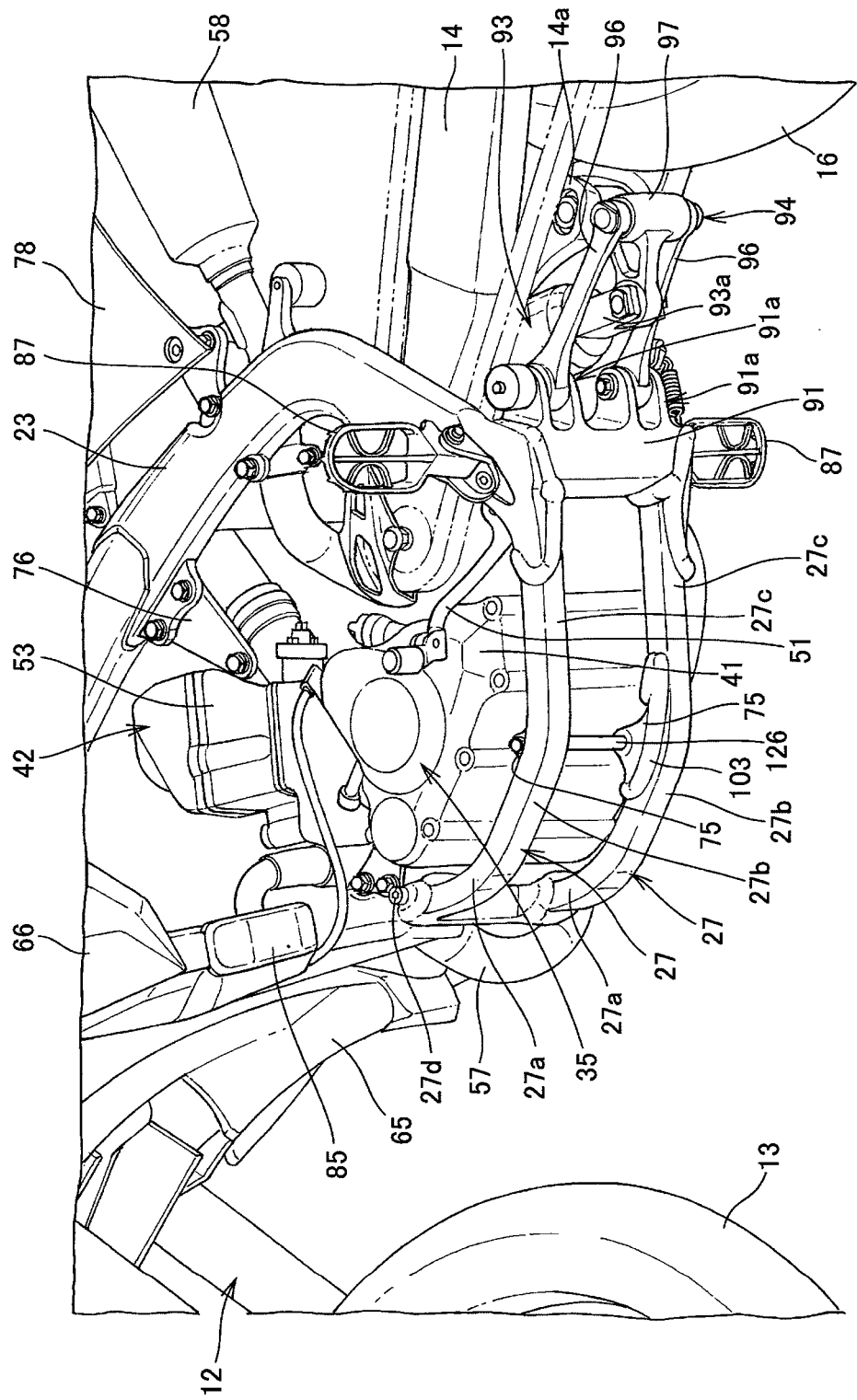
FIG. 8 is a perspective view showing the motorcycle in a state where the engine guard is removed from the motorcycle in a state shown in FIG. 4.
Figure 9:
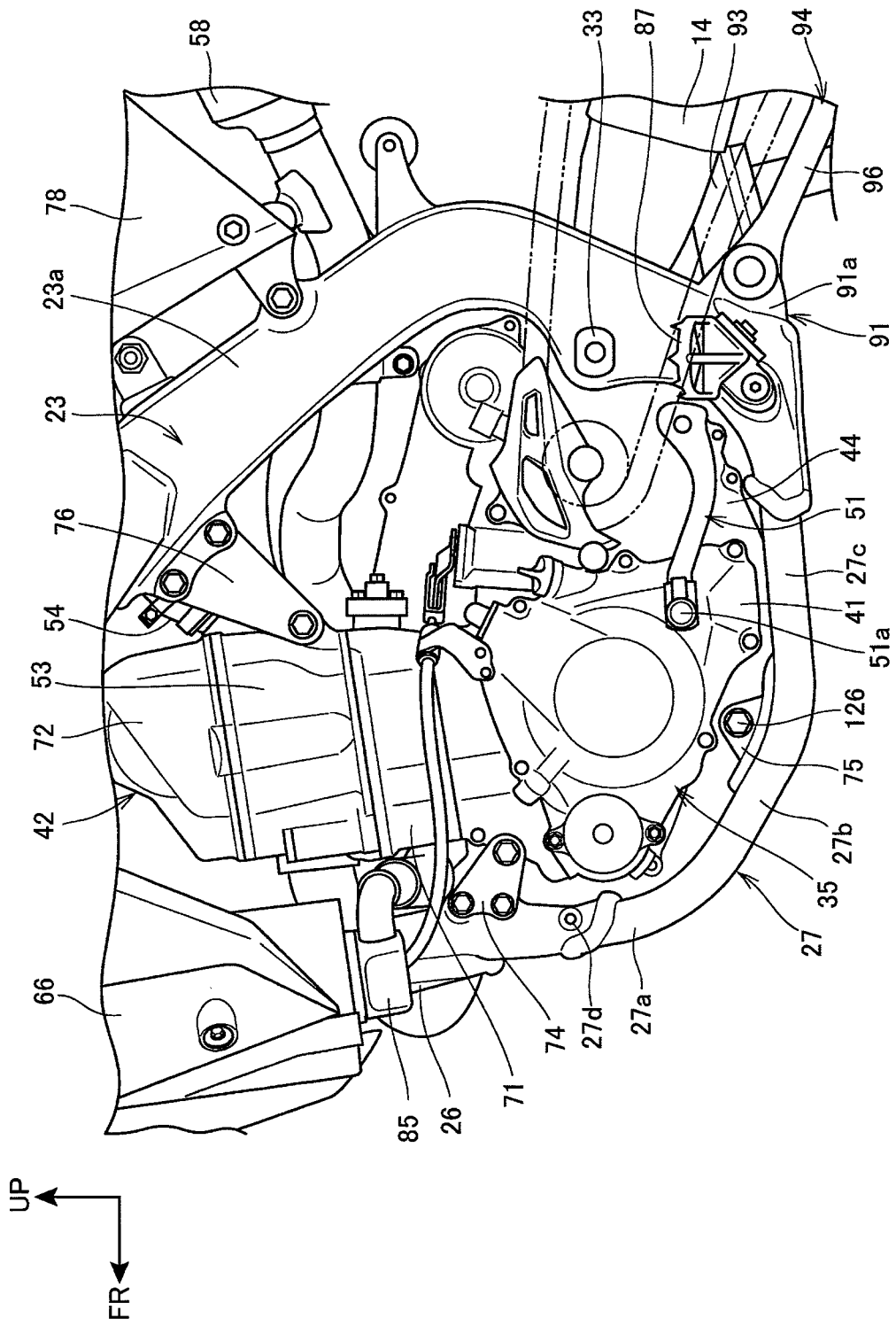
FIG. 9 is a left side view showing the motorcycle in a state where the engine guard is removed from the motorcycle in a state shown in FIG. 2.

FIG. 8 is a perspective view showing the motorcycle 10 in a state where the engine guard 61 is removed from the motorcycle 10 in a state shown in FIG. 4. FIG. 9 is a left side view showing the motorcycle 10 in a state where the engine guard 61 is removed from the motorcycle 10 in a state shown in FIG. 2.

As shown in FIG. 8 and FIG. 9, the lower frames 27 are formed of a pair of left and right square pipes arranged substantially parallel to each other except for upper end portions thereof. Each lower frame 27 is an integral body formed of a frame upper portion 27a, a frame inclined portion 27b, and a frame lower portion 27c.

The frame upper portion 27a extends substantially downwardly from a lower end portion of the down frame 26 as viewed in a side view. The frame inclined portion 27b is bent from a lower end of the frame upper portion 27a and extends obliquely rearwardly and downwardly as viewed in a side view. The frame lower portion 27c is bent from a rear end portion of the frame inclined portion 27b, extends substantially rearwardly, and is joined to a lower end portion of the center frame 23.

The engine hanger 75 extends from the frame inclined portion 27b to the frame lower portion 27c and is fixed to an upper surface and an inner surface of the frame inclined portion 27b and the frame lower portion 27c by welding, respectively. A weld bead 103 is formed by welding the engine hanger 75 with the weld bead 103 being formed over the whole circumference of the engine hanger 75.

A support shaft 126 extends between the left and right engine hangers 75 with a lower portion of the crankcase 41 being supported on the support shaft 126.

Figure 10A:
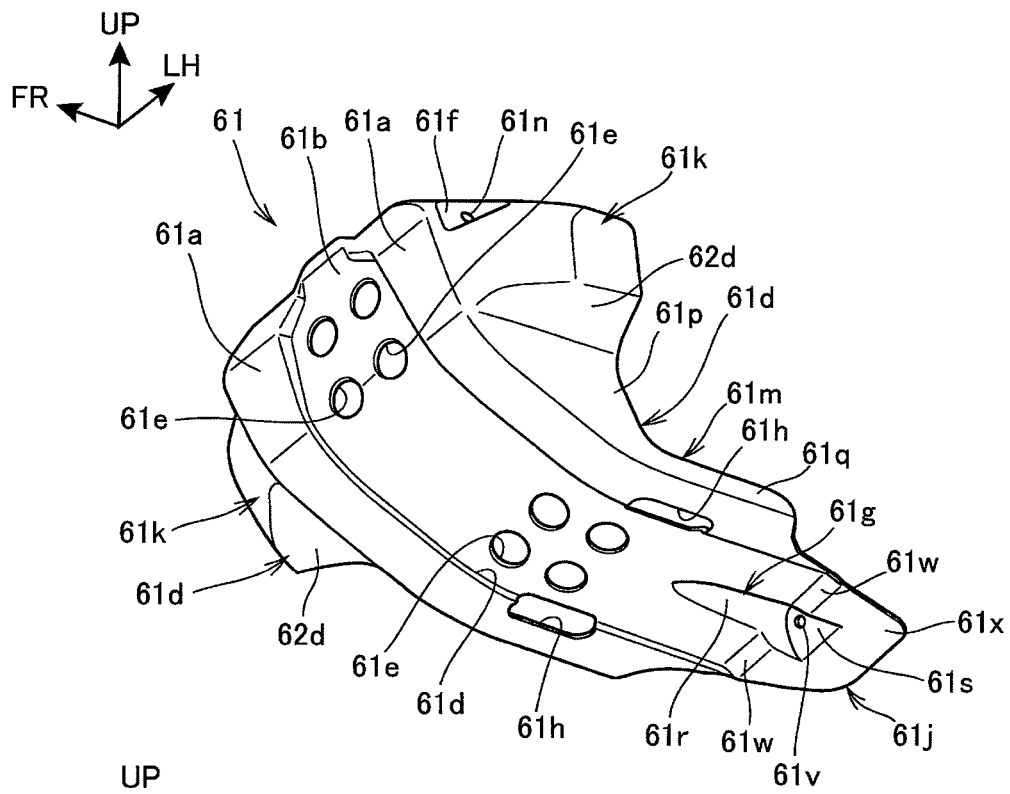
Figure 10B:
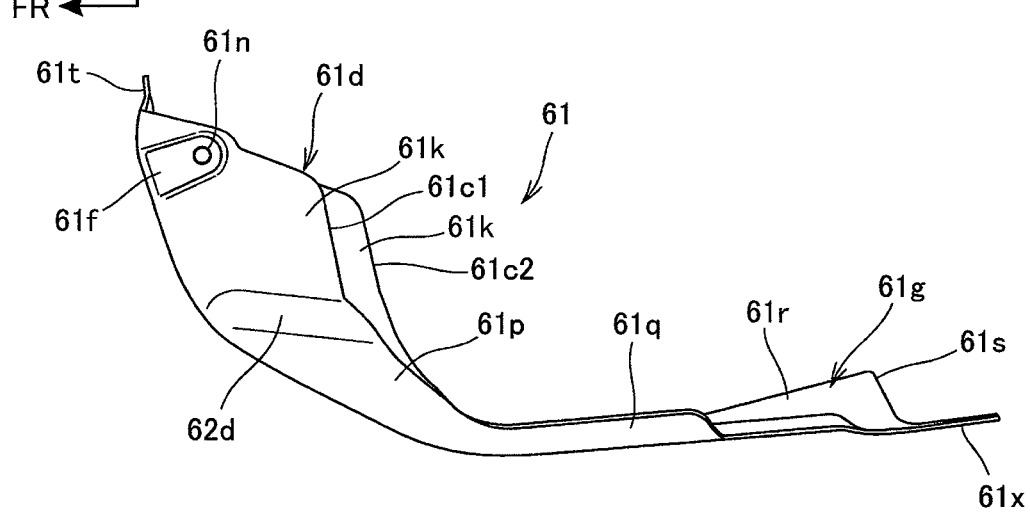

FIG. 10(A) and FIG. 10(B) are first explanatory views for explaining the engine guard 61. FIG. 10(A) is a perspective view of the engine guard 61 as viewed from an oblique lower side, and FIG. 10(B) is a left side view of the engine guard 61.

As shown in FIG. 10(A) and FIG. 10(B), the side wall portion 61d of the engine guard 61 includes the sidewardly bulging portions 61k which are formed so as to bulge to the side on a front portion thereof with raised wall portions 61m being integrally formed with the sidewardly bulging portions 61k and raised from side edge portions of the frame protective portions 61a.

The sidewardly bulging portions 61k cover the front end portion of the crankcase 41 (see FIG. 2 and FIG. 6) from a front side, from lateral sides and from below, and a front end fixing portion 61f is formed on the front end portions of the sidewardly bulging portions 61k as a recessed portion indented inward in the vehicle width direction. A bolt through hole 61n is formed in the front end fixing portion 61f. The front end portion of the engine guard 61 is fastened to the lower frame 27 (see FIG. 2) by the bolts 81 (see FIG. 2) which are made to pass through the bolt through holes 61n, respectively. The bolts 81 are inserted into the bolt through holes 61n from the outside in the vehicle width direction to the inside in the vehicle width direction and, thereafter, are threaded into threaded holes 27d (see FIG. 8 and FIG. 9) which are formed in a side surface of an upper end portion of the lower frame 27.

The raised wall portion 61m is an integral body formed of a front raised wall portion 61p whose height is gradually lowered as the front raised wall portion 61p extends rearwardly from the sidewardly bulging portion 61k, and a rear raised wall portion 61q extends rearwardly from the front raised wall portion 61p with a substantially fixed height. The front raised wall portion 61p and the rear raised wall portion 61q are portions bent approximately perpendicular to the frame protective portion 61a, and function as ribs for enhancing rigidity of the engine guard 61 by reinforcing the frame protective portions 61a, respectively.

In FIG. 10(B), a rear edge 61c2 of the right sidewardly bulging portion 61k (on a depth side as viewed from a viewer's side) is positioned behind a rear edge 61c1 of the left sidewardly bulging portion 61k (on a viewer's side as viewed from a viewer's side). More specifically, the right sidewardly bulging portion 61k can cover a side surface of the engine from the side including an area of the side surface of the engine which is disposed behind the left sidewardly bulging portion 61k.

An upper edge of an upper wall 61r of the rear fixing portion 61g is inclined rearwardly and upwardly as viewed in a side view with a rear wall 61s of the rear fixing portion 61g being bent approximately perpendicular to the upper edge of the upper wall 61r and is inclined rearwardly and downwardly.

The bulging portion lower walls 62d of the sidewardly bulging portions 61k extend substantially horizontally in the longitudinal direction. Thus, it is possible to make the flow of traveling air smooth thus reducing air resistance.

Figure 11A:
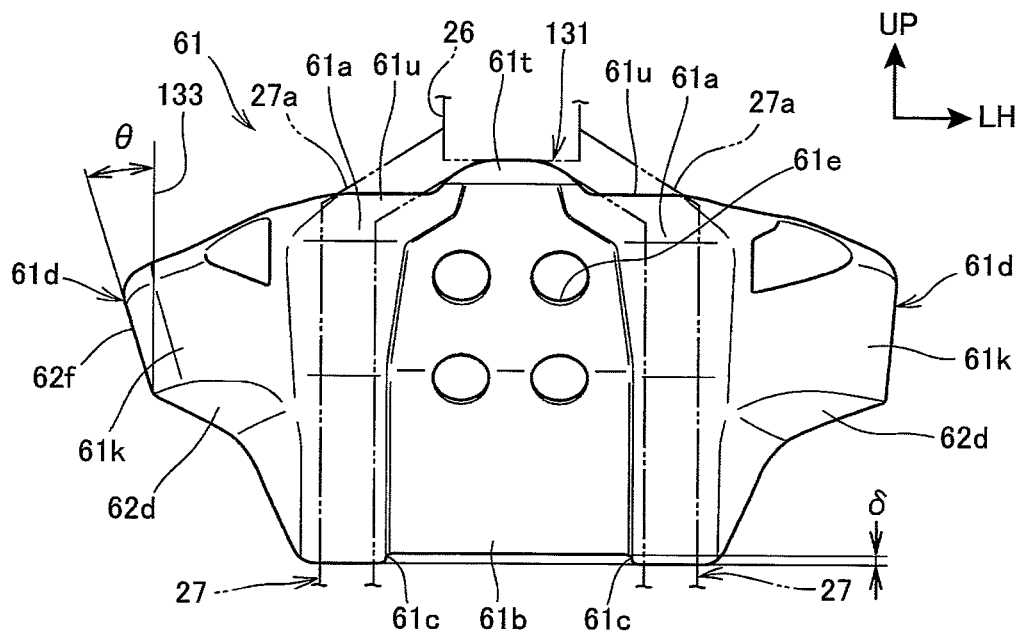
Figure 11B:
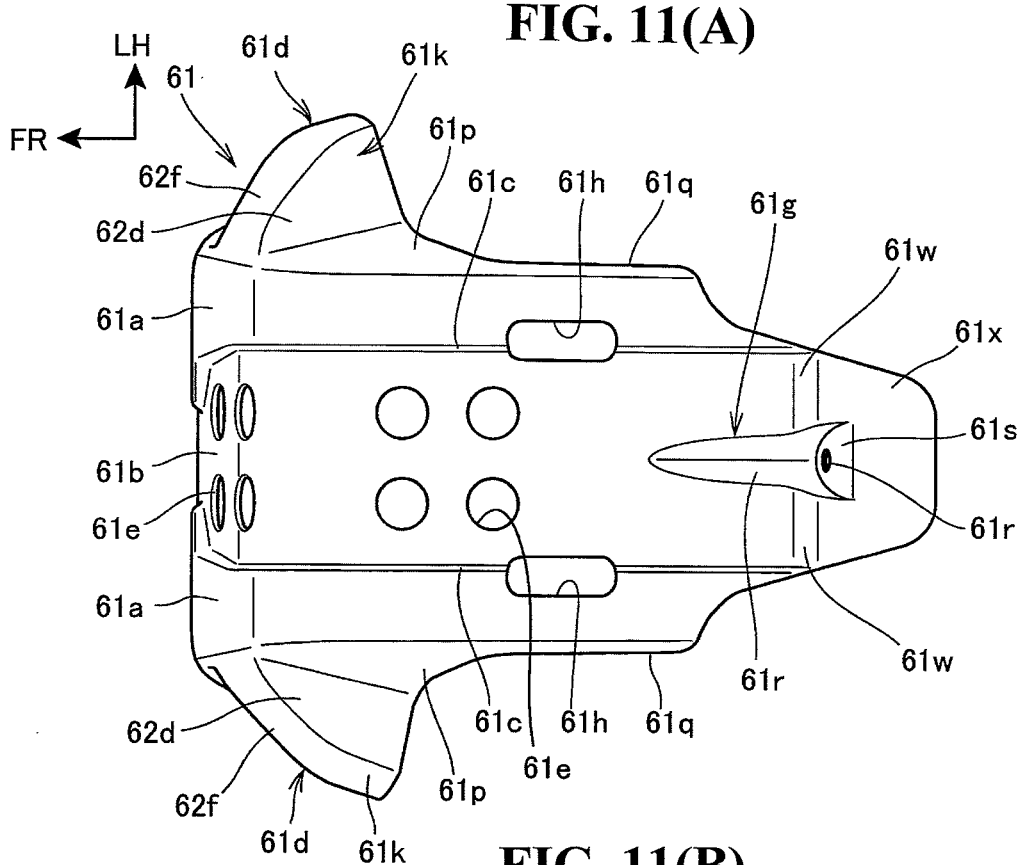

FIG. 11(A) and FIG. 11(B) are second explanatory views for explaining the engine guard 61. FIG. 11(A) is a front view of the engine guard 61, and FIG. 11(B) is a bottom view of the engine guard 61.

As shown in FIG. 11(A), a step having a height 5 is formed between the frame protective portions 61a and the engine protective portion 61b. As described above, by providing the step between the frame protective portions 61a and the engine protective portion 61b thus indenting the engine protective portion 61*b* toward the inside of the vehicle body, a minimum ground clearance of the vehicle is not lowered.

An upwardly projecting wall portion 61*t* projects upwardly and is integrally formed on respective upper end portions of the left and right frame protective portions 61*a*, 61*a* and the engine protective portion 61*b* of the engine guard 61 in a state where the upwardly projecting wall portion 61*t* extends over the left and right frame protective portions 61*a*, 61*a* and the engine protective portion 61*b*.

The upwardly projecting wall portion 61*t* is a portion covers a gap 131 (see also FIG. 3) formed above upper edges 61*u*, 61*u* of the respective left and right frame protective portions 61*a*, 61*a* and below the inclined frame upper portions 27*a*, 27*a* of the left and right lower frames 27, 27 and the lower end of the down frame 26. By providing the upwardly projecting wall portion 61*t* as described above, it is possible to prevent stones or the like from entering an engine 35 side (see FIG. 3) from the gap 131, and it is possible to enhance an external appearance of the vehicle.

The right sidewardly bulging portion 61*k* has a side surface 62*f* thereof inclined by an angle θ with respect to an extension 133. A projection amount of the left sidewardly bulging portion 61*k* toward the outside in the vehicle width direction and a projection amount of the right sidewardly bulging portion 61*k* toward the outside in the vehicle width direction are equal to each other. However, by making the left and right sidewardly bulging portions 61*k*, 61*k* different from each other in shape, more specifically, by forming the left and right sidewardly bulging portions 61*k*, 61*k* asymmetrically, it is possible to properly cover the left and right engine side surfaces having different shapes.

The bulging portion lower wall 62*d* of the sidewardly bulging portion 61*k* is formed approximately horizontally. Thus, a projection area of the sidewardly bulging portion 61*k* in the longitudinal direction of the vehicle can be made small. Eventually, a projection area of the engine guard 61 in the longitudinal direction of the vehicle can be made small. Accordingly, an air resistance of the engine guard 61 during operation of the vehicle can be further decreased.

As shown in FIG. 11(B), the rear portion fixing portion 61*g* is formed on the rear portion of the engine guard 61 at the center in the vehicle width direction, and is formed of the upper wall 61*r* which is indented upwardly and is formed in an elongated manner in the longitudinal direction, and the rear wall 61*s* is formed on a rear end portion of the upper wall 61*r*.

The upper wall 61*r* is formed such that a width of the upper wall 61*r* in the vehicle width direction is gradually narrowed and a height of the upper wall 61*r* is gradually lowered as the upper wall 61*r* extends to the front in the longitudinal direction of the vehicle. A bolt through hole 61*v* which allows the bolt 98 (see FIG. 5) for mounting the rear portion of the engine guard 61 on the cross frame 91 (see FIG. 5) to pass therethrough is formed in the rear wall 61*s*. More specifically, the bolt 98 is inserted into the bolt through hole 61*v* from a rear side of the rear wall 61*s*, and is threaded into the threaded hole formed in the front surface of the cross frame 91 (see FIG. 5).

The side surfaces 62*f* of the respective left and right sidewardly bulging portions 61*k*, 61*k* are gradually curved rearwardly as the side surfaces 62*f* are separated outwardly in the vehicle width direction from the left and right frame protective portions 61*a*. Accordingly, a flow of air can smoothly flown rearwardly along the side surface 62*f* thus reducing an air resistance of the engine guard 61.

Figure 12A:
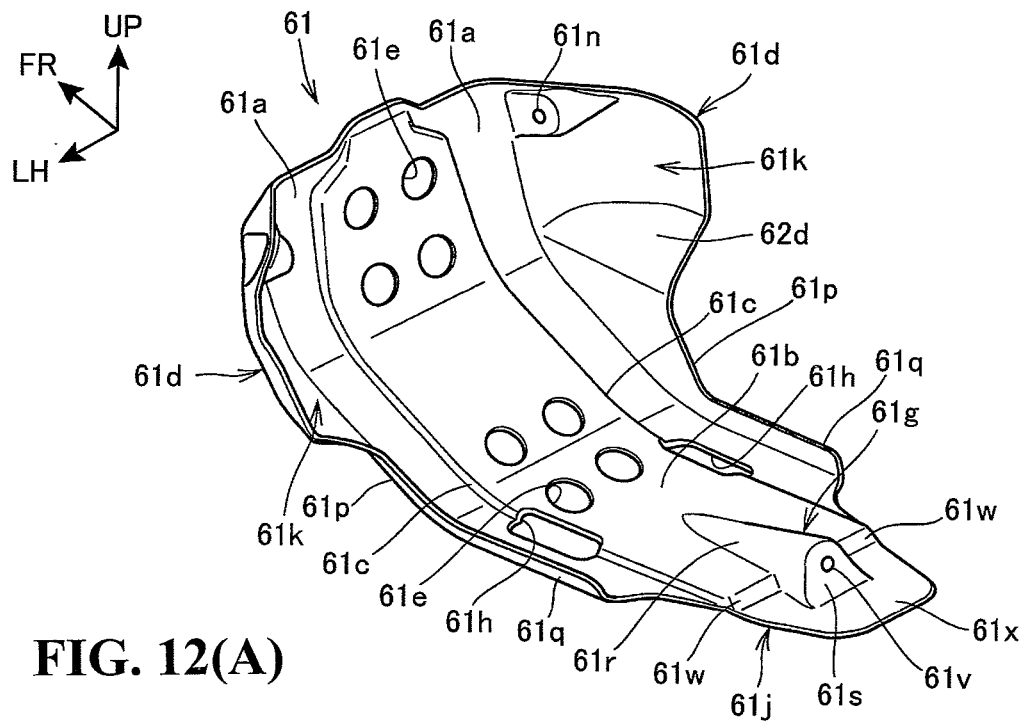
Figure 12B:
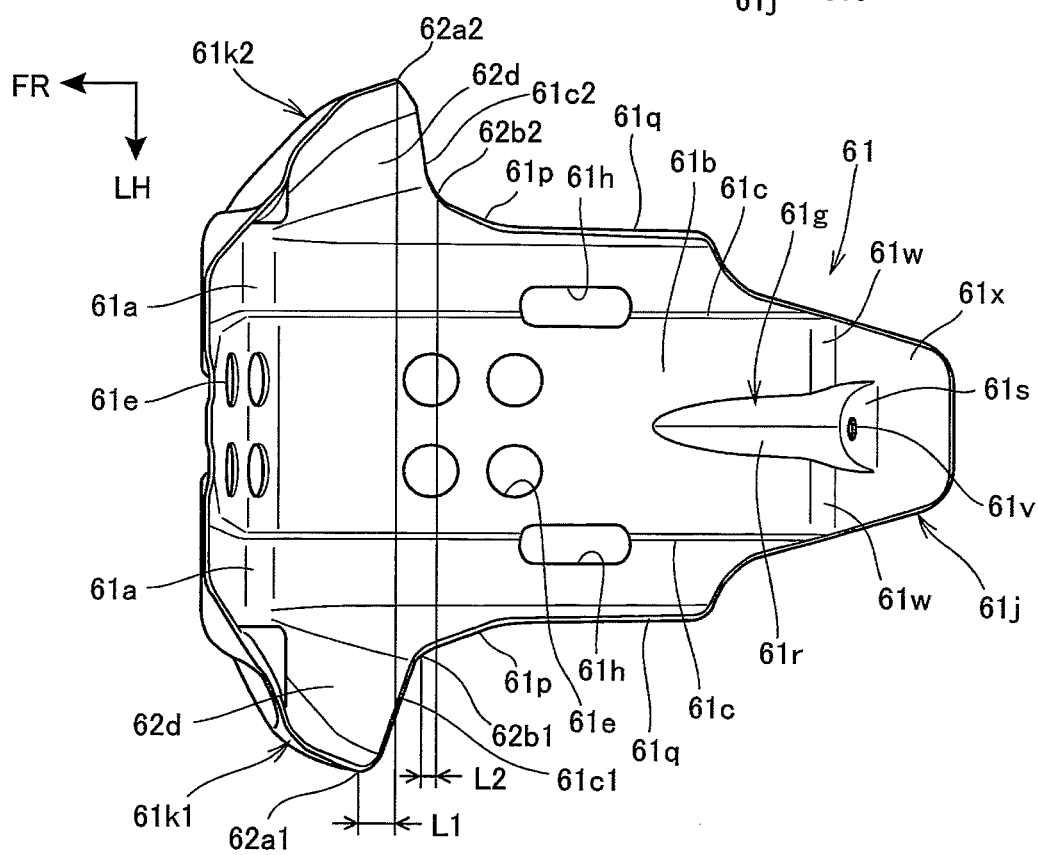

FIG. 12(A) and FIG. 12(B) are third explanatory views for explaining the engine guard 61. FIG. 12(A) is a perspective view of the engine guard 61 as viewed from an oblique upper side, and FIG. 12(B) is a plan view of the engine guard 61.

As shown in FIG. 12(A) and FIG. 12(B), a lower step portion 61*x* is formed one step lower than the engine protective portion 61*b* by way of connecting portions 61*w*, 61*w* which are bent downwardly from the engine protective portion 61*b* and formed on the rear end portion 61*j* of the engine guard 61. The lower step portion 61*x* is a portion arranged along a lower surface of the cross frame 91 (see FIG. 4), and is formed approximately flatly.

The upper wall 61*r* of the rear portion fixing portion 61*g* is formed in an extending manner over the engine protective portion 61*b*, the connecting portions 61*w* and the lower step portion 61*x*, and the rear wall 61*s* is connected to the lower step portion 61*x*.

By forming the connecting portions 61*w* which are bent downwardly on the rear end portion 61*j* as described above. Thus, the rigidity of the rear end portion 61*j* can be increased. Further, by forming the rear portion fixing portion 61*g* which extends in the longitudinal direction on the rear end portion 61*j* over the lower step portion 61*x* from the engine protective portion 61*b*, the rear portion fixing portion 61*g* functions as a rib thus further enhancing the rigidity of the rear end portion 61*j*.

In FIG. 12(B), the left sidewardly bulging portion 61*k* and the right sidewardly bulging portion 61*k* are distinguished from each other as the left sidewardly bulging portion 61*k*1 and the right sidewardly bulging portion 61*k*2, respectively.

A most sidewardly bulging portion 62*a*2 which projects sideward the most in the right sidewardly bulging portion 61*k*2 is positioned behind a most sidewardly bulging portion 62*a*1 which projects sideward the most in the left sidewardly bulging portion 61*k*1 by a distance L1. Further, a rear end portion 62*b*2 is positioned at a rearmost side in the right sidewardly bulging portion 61*k*2 and is positioned behind a rear end portion 62*b*1 positioned at a rearmost side in the left sidewardly bulging portion 61*k*1 by a distance L2. More specifically, as described previously, the rear edge 61*c*2 of the right sidewardly bulging portion 61*k*2 is positioned behind the rear edge 61*c*1 of the left sidewardly bulging portion 61*k*1.

The water pump 111 (see FIG. 6) and the radiator hose 112 shown in FIG. 6 are arranged inside the right sidewardly bulging portion 61*k*2 in the vehicle width direction. Thus, the shape of the right sidewardly bulging portion 61*k*2 is changed corresponding to such an arrangement with respect to the shape of the left sidewardly bulging portion 61*k*1 thus properly protecting the engine 35.

The left and right front raised wall portions 61*p*, 61*p* and the left and right rear raised wall portions 61*q*, 61*q* are formed along the longitudinally elongated opening portions 61*h*, 61*h*, respectively. Thus, the rigidity of the engine guard 61 which is lowered due to the formation of the opening portions 61*h* can be effectively increased by the front raised wall portions 61*p* and the rear raised wall portions 61*q*.

Further, the rigidity of the rear end portion 61*j* having a width in the vehicle width direction that is gradually narrowed as the rear end portion 61*j* extends rearwardly can be increased by the connecting portions 61*w*. The rear portion fixing portion 61*g* which is arranged at a position where the rear portion fixing portion 61*g* overlaps with the left and right rear raised wall portions 61*q*, 61*q* in the longitudinal direction.

As shown in FIGS. 1, 3 and 11(A) described above, in the motorcycle 10 as a saddle-ride-type vehicle which includes the head pipe 21; the lower frames 27 as frame members which extend from the head pipe 21 and support the engine 35; and the engine guard 61 as a vehicle body lower portion protective member which extends from an area in front of the engine 35 to an area below the engine 35, the engine guard 61 includes the engine protective portion 61b for covering the engine 35; and the frame protective portions 61a for protecting the lower frames 27. The engine protective portion 61b and the frame protective portions 61a are disposed with a step formed therebetween.

With such a configuration, the lower frames 27 are protected by the frame protective portions 61a, respectively. Further, by providing the engine protective member 61b and the frame protective portions 61a with the step formed therebetween, a modulus of section of the engine guard 61 can be increased. Thus, the rigidity of the engine guard 61 can be increased.

As shown in FIGS. 5 and 11(A), the frame protective portions 61a are fon led in a pair in a spaced-apart manner from each other in the vehicle width direction with the engine protective portion 61b being disposed integrally with the pair of frame protective portions 61a, 61a with the step having a height 5 formed therebetween. With such a configuration, the engine protective portion 61b is supported on the frame protective portions 61a. Thus, the rigidity of the engine guard 61 can be further increased. Further, the frame protective portions 61a are integrally formed with the engine protective portion 61b. Thus, a bracket for fixing the frame protective portions 61a or the engine protective portion 61b to a vehicle body side becomes unnecessary whereby the configuration can be simplified.

The engine protective portion 61b is disposed in an indented manner toward the inside of the vehicle body compared to the frame protective portions 61a. Thus, the engine protective portion 61b does not project from the frame protective portions 61a. Further, a minimum ground clearance of the vehicle is not lowered whereby the interference of the engine protective portion 61b with an obstacle can be suppressed.

As shown in FIG. 5, the weld beads 103 for welding with another member are formed on the lower frame 27, and the opening portions 61h are formed in portions of the frame protective portions 61a which correspond to the weld beads 103. Thus, it is unnecessary to form projecting portions on the frame protective portion 61a corresponding to the weld beads 103 of the lower frame 27. Furthermore, a minimum ground clearance of the vehicle is not lowered whereby the interference of the frame protective portions 61a with an obstacle can be suppressed.

As shown in FIGS. 4 and 5, the motorcycle 10 includes the cross frame 91 for connecting the pair of lower frames 27, 27 to each other with the engine guard 61 being fixed to the cross frame 91 in the longitudinal direction of the vehicle. With such a configuration, there is no possibility that a fixing member such as the bolt 98 for fixing the engine guard 61 to the vehicle body projects to an area below the vehicle. Thus, a minimum ground clearance of the vehicle is not lowered whereby the interference of the engine guard 61 with an obstacle can be suppressed.

As shown in FIG. 5, the rear portion fixing portion 61g which forms a fixing portion is provided to the rear end portion 61j of the engine guard 61 at the center in a vehicle width direction for fixing the engine guard 61 to the cross frame 91. The rear end portion 61j of the engine guard 61 is formed in a tapered shape as the rear end portion 61j and extends rearwardly in the longitudinal direction of the vehicle. Thus, rattling of the rear end portion 61j fixed by the rear portion fixing portion 61g can be suppressed, and the rear end portion 61j can be fixed at the small number of fixing positions.

Further, as shown in FIGS. 4, 5 and 11(B), the rear portion fixing portion 61g is a recessed portion indented toward the inside of the vehicle, and the bolt through hole 61v which allows the fixing bolt 98 for fixing the engine guard 61 to the cross frame 91 to pass therethrough is formed in the rear end portion of the recessed portion. Thus, it is possible to make the fixing bolt 98 to have a minimally interfere with an obstacle.

As shown in FIGS. 2, 3 and 12(A), the frame protective portion 61a is configured such that the front raised wall portion 61p and the rear raised wall portion 61q which form the ribs are formed along the side surface of the lower frame 27, and the rear portion fixing portion 61g is disposed at the position where the rear portion fixing portion 61g overlaps with the front raised wall portion 61p and the rear raised wall portion 61q as viewed in a side view. With such a configuration, a modulus of the section of the engine guard 61 can be increased. Thus, the rigidity of the engine guard 61 can be increased.

Further, as shown in FIGS. 2 and 7, the engine guard 61 includes the sidewardly bulging portions 61k as the engine side surface protective portions which cover the side surfaces of the engine 35 from the outside in the vehicle width direction. The sidewardly bulging portion 61k is disposed at the position where the sidewardly bulging portion 61k overlaps with the gear changing pedal 51 provided to the transmission 44 attached to the engine 35 in a height direction as viewed from a front side of the vehicle. Thus, the side surfaces of the engine can be protected by the sidewardly bulging portions 61k, and the gear changing pedal 51 and legs for operating the gear changing pedal 51 can be protected from an object scattered from a front side.

The above-mentioned embodiment merely shows one mode of the invention. Various modifications and applications are conceivable as desired without departing from the gist of the invention.

The invention is applicable not only to the motorcycle 10 but also to saddle-ride-type vehicles besides the motorcycle 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle comprising:
a head pipe;
a frame member extending from the head pipe for supporting an engine; and
a vehicle body lower portion protective member extending from an area in front of the engine to an area below the engine;
wherein the vehicle body lower portion protective member includes an engine protective portion for covering the engine; and a frame protective portion for protecting the frame member, and the engine protective portion and the frame protective portion are disposed with a step formed therebetween;
wherein a weld bead for welding with another member is formed on the frame member, and an opening portion is formed in a portion of the frame protective portion corresponding to the weld bead.

2. The saddle-ride vehicle according to claim 1, wherein the frame protective portion is formed of a pair of frame protective portions disposed in a spaced-apart manner from each other in a vehicle width direction, and the engine protective portion is disposed integrally with the pair of frame protective portions with the step formed therebetween.

3. The saddle-ride vehicle according to claim 2, wherein the engine protective portion is disposed in an indented manner toward the inside of a vehicle body compared to the frame protective portion.

4. The saddle-ride vehicle according to claim 2, wherein the saddle-ride vehicle includes a cross frame joined between a pair of frame members, and the vehicle body lower portion protective member is fixed to the cross frame in a longitudinal direction of the vehicle.

5. The saddle-ride vehicle according to claim 4, wherein a fixing portion is provided to a rear end portion of the vehicle body lower portion protective member at the center in a vehicle width direction for fixing the vehicle body lower protective member to the cross frame, and the rear end portion of the vehicle body lower portion protective member is formed in a tapered shape as the rear end portion extends rearwardly in the longitudinal direction of the vehicle.

6. The saddle-ride vehicle according to claim 5, wherein the fixing portion is a recessed portion indented toward the inside of the vehicle, and a bolt through hole for allowing a fixing bolt for fixing the engine body lower portion protective member to the cross frame to pass therethrough being formed in a rear end portion of the recessed portion.

7. The saddle-ride vehicle according to claim 4, wherein a fixing portion is a recessed portion indented toward the inside of the vehicle, and a bolt through hole for allowing a fixing bolt for fixing the engine body lower portion protective member to the cross frame to pass therethrough being formed in a rear end portion of the recessed portion.

8. The saddle-ride vehicle according to claim 7, wherein the frame protective portion is configured such that a rib is formed along a side surface of the frame member, and the fixing portion is disposed at a position where the fixing portion overlaps with the rib as viewed in a side view.

9. The saddle-ride vehicle according to claim 2, wherein the vehicle body lower portion protective member includes an engine side surface protective portion for covering a side surface of the engine from the outside in a vehicle width direction, and the engine side surface protective portion is disposed at a position where the engine side surface protective portion overlaps with a gear changing pedal provided to a transmission attached to the engine in a height direction as viewed from a front side of the vehicle.

10. The saddle-ride vehicle according to claim 1, wherein the engine protective portion is disposed in an indented manner toward the inside of a vehicle body compared to the frame protective portion.

11. The saddle-ride vehicle according to claim 10, wherein the saddle-ride vehicle includes a cross frame joined between a pair of frame members, and the vehicle body lower portion protective member is fixed to the cross frame in a longitudinal direction of the vehicle.

12. The saddle-ride vehicle according to claim 1, wherein the saddle-ride vehicle includes a cross frame joined between a pair of frame members, and the vehicle body lower portion protective member is fixed to the cross frame in a longitudinal direction of the vehicle.

13. The saddle-ride vehicle according to claim 1, wherein the vehicle body lower portion protective member includes an engine side surface protective portion for covering a side surface of the engine from the outside in a vehicle width direction, and the engine side surface protective portion is disposed at a position where the engine side surface protective portion overlaps with a gear changing pedal provided to a transmission attached to the engine in a height direction as viewed from a front side of the vehicle.

14. A saddle-ride vehicle comprising:
a frame member for supporting an engine; and
a vehicle body lower portion protective member extending from an area in front of the engine to an area below the engine;
said vehicle body lower portion protective member including:
an engine protective portion for covering the engine; and
a frame protective portion for protecting the frame member;
said engine protective portion and the frame protective portion being disposed with a step formed therebetween;
wherein a weld bead for welding with another member is formed on the frame member, and an opening portion is formed in a portion of the frame protective portion corresponding to the weld bead.

15. The saddle-ride vehicle according to claim 14, wherein the frame protective portion is formed of a pair of frame protective portions disposed in a spaced-apart manner from each other in a vehicle width direction, and the engine protective portion is disposed integrally with the pair of frame protective portions with the step formed therebetween.

16. The saddle-ride vehicle according to claim 14, wherein the engine protective portion is disposed in an indented manner toward the inside of a vehicle body compared to the frame protective portion.

* * * * *